United States Patent
Matsuzaki et al.

(10) Patent No.: US 7,220,817 B2
(45) Date of Patent: May 22, 2007

(54) PROCESS FOR PRODUCING POLYARYLENE SULFIDE

(75) Inventors: Mitsuhiro Matsuzaki, Fukushima-ken (JP); Masaru Kagoshima, Fukushima-Ken (JP)

(73) Assignee: Kureha Corporation, Tokyo (JP)

( * ) Notice: Subject to any disclaimer, the term of this patent is extended or adjusted under 35 U.S.C. 154(b) by 174 days.

(21) Appl. No.: 10/520,620

(22) PCT Filed: Jul. 11, 2003

(86) PCT No.: PCT/JP03/08852

§ 371 (c)(1),
(2), (4) Date: Jan. 10, 2005

(87) PCT Pub. No.: WO2004/009674

PCT Pub. Date: Jan. 29, 2004

(65) Prior Publication Data

US 2005/0215759 A1 Sep. 29, 2005

(30) Foreign Application Priority Data

Jul. 18, 1920 (JP) .............................. 2002-209346

(51) Int. Cl.
*C08G 75/00* (2006.01)
*C08G 75/14* (2006.01)

(52) U.S. Cl. ...................... 528/373; 528/397; 528/487; 528/499; 528/503; 210/660

(58) Field of Classification Search ................ 528/373, 528/397, 487, 499, 503, 660
See application file for complete search history.

(56) References Cited

U.S. PATENT DOCUMENTS

| 4,794,164 A | 12/1988 | Iwasaki et al. |
| 5,037,954 A | 8/1991 | Nesheiwat et al. |
| 5,312,894 A | 5/1994 | Kawakami et al. |

FOREIGN PATENT DOCUMENTS

| EP | 0 259 984 | 9/1988 |
| EP | 0 436 120 | 7/1991 |
| EP | 0 568 366 | 11/1993 |
| JP | 10-87831 | 4/1998 |

*Primary Examiner*—Duc Truong
(74) *Attorney, Agent, or Firm*—Wenderoth, Lind & Ponack, L.L.P.

(57) ABSTRACT

A process for producing polyarylene sulfide includes: steps of reacting an aromatic dihalide compound and an alkaline metal compound in a polar organic solvent for polymerization under heating and cooling a system including the reaction mixture to recover particulate polyarylene sulfide (PAS). The system after the reaction is gradually cooled at an average cooling speed of 0.2 to 1.0 deg. C./min. selectively in a temperature range of from 1 deg. C. below to 1 deg. C. above a maximum system-viscosity temperature. As a result, the process can be operated at a relatively short polymerization cycle and yet provides the product PAS particles with a high and stable bulk density as to exhibit good processability in the transportation and storage, and excellent transportability in a hopper or a screw of an extruder or a molding machine.

33 Claims, No Drawings

PROCESS FOR PRODUCING POLYARYLENE SULFIDE

TECHNICAL FIELD

The present invention relates to a process for producing a polyarylene sulfide (hereinafter sometimes abbreviated as "PAS"), more particularly to a process for effectively producing high-quality PAS.

BACKGROUND ART

PAS as represented by polyphenylene sulfide (hereinafter sometimes abbreviated as "PPS") is an engineering plastic which is excellent in properties, such as heat resistance, chemical resistance, flame retardancy, mechanical strength, electrical properties, and size stability. PAS can be formed into various shaped products, film, sheet, fiber, etc., by ordinary melt-forming processes, such as extrusion, injection molding, and compression molding, and is therefore widely used in versatile fields, inclusive of electrical and electronic industries and car industries. Further, powdery PAS may also be used in the fields of, e.g., coatings on metals and other materials.

A typical process for producing PAS may comprise a step of reacting an aromatic dihalide compound and an alkaline metal compound in a polar organic solvent such as an organic amide under heating for polymerization (and condensation) (hereinafter referred to as a "reaction step" or "polymerization step"), and steps disposed before and after the reaction step. Principal steps disposed after the reaction step may include: a step of cooling the reaction mixture including the produced PAS to or below a temperature at which the reaction mixture exhibits a vapor pressure below the atmospheric pressure (hereinafter referred to as a "cooling step") and a step of isolating PAS from the cooled mixture including PAS (hereinafter referred to as a "washing-filtration-drying step").

In some cases, a dehydration step for adjusting moisture in the system is placed prior to the (polymerization) reaction step that is performed by adding the aromatic dihalide compound. More specifically, in this case, PAS is produced through a combination of respective steps including the dehydration step, the polymerization step, the cooling step, the washing-filtration-drying step, a step of recovering unreacted starting materials, and a step of recovering the polar organic solvent.

Regarding the cooing step, Japanese Laid-Open Patent Application (JP-A) 59-49232 discloses a process for producing polyarylene sulfide wherein the system after the polymerization is gradually cooled at a rate slower than 50° C./min. from the polymerization temperature down to a temperature of 240° C. or below, thereby precipitating the polymer particles and providing fine polymer crystals having sizes of at least 60 Å. The JP reference however includes various descriptions regarding the gradual cooling temperature and the gradual cooling rate, such as down to 240° C. or below, preferably down to at least 200° C. or below for the gradual cooling temperature region, and a rate slower than 50° C./min., preferably a rate slower than 10° C./min. for the gradual cooling rate. Particularly, in the working examples, there are disclosed a mode of gradual cooling at a rate of 1° C./min. from 260° C. down to 150° C. (Example 1) and a mode of gradual cooling at a rate of 0.5° C./min. from 260° C. down to 100° C. (Example 2). Accordingly, these Examples require cooling periods of 110 min. and 220 min. respectively for the cooling from 260° C. down to 150° C.

JP-A 2001-89569 discloses a process for producing PAS particles of high purity through a short polymerization process time by controlling the cooling rate within a range of 0.2–1.3° C./min. in a temperature range of 245° C. or below, based on a knowledge that the formation of polymer particles and the amount of by-products in the resultant polymer particles are affected by the mol ratio of the aromatic polyhalide compound to the polar organic solvent and the cooling rate after the polymerization reaction. The JP reference describes only the reduction in amount of the resultant by-products generated as gases when the product PAS is heated, as the effect of the gradual cooling, and does not refer at all to any other properties of PAS. Further, as for the cooling temperature range, Example 1 refers to 245° C. to 218° C.; Example 2, 245° C. to 212° C.; and Example 3, 245° C. to 210° C. This means that if the temperature range of 245° C. to 218° C. is subjected to gradual cooling at the upper limit cooling rate of 1.3° C./min., the gradual cooling requires a period of at least 20 min., and the shortening of the polymerization cycle including the cooling step is not yet at a satisfactory level.

DISCLOSURE OF INVENTION

In view of the above-mentioned circumstances of the prior art, a principal object of the present invention is to provide a process for producing through a relatively short polymerization cycle time such PAS particles having a high and stable bulk density as to exhibit good processability in transportation and storage, and excellent transportability in a hopper or a screw of an extruder or a molding machine.

A further object of the present invention is to apply the above-mentioned process to a PAS production process including a phase-separation polymerization system capable of producing high-molecular weight PAS particles.

As a result of our study with the above-mentioned objects, we have discovered that an extremely limited temperature region in the course of cooling after the polymerization under heating, that is a temperature region of maximum system-viscosity temperature ±1° C. selectively and essentially determines the particle properties as represented by bulk density of product PAS particles. Herein, the maximum system-viscosity temperature refers to a temperature at which a reaction system (i.e., the content in the reaction vessel) assumes a maximum viscosity in the course of the cooling. More specifically, it is known that in a reaction vessel after the completion of polymerization involving the phase-separation polymerization system capable of producing high-molecular weight PAS, PAS is present in a molten state and is phase-separated into a thick phase and a dilute phase. Then, if the system is cooled under stirring, PAS is solidified from the molten state and is caused to be present as a powdery, particulate or granular solid in a suspended state. During this stage, the change in system-viscosity occurs. More specifically, when the dispersion system including the molten PAS is cooled under stirring, the apparent viscosity of the entire system gradually increases due to the viscosity increase of PAS caused by the cooling, and below a certain temperature (i.e., the maximum system-viscosity temperature), the apparent viscosity of the entire system becomes lower. The maximum system-viscosity temperature can be detected by observation of a stirring torque or a power supply to the stirrer under a constant stirring speed. Further, according to our study, it has been found that the cooling speed in the extremely limited temperature region of the maximum system-viscosity temperature ±1° C. determines the particle properties as represented by the bulk density of the product PAS particles (that is, a lower cooling speed within the range of 0.2–1.0° C./min. tends to result in a higher bulk density of the product PAS particles) and the cooling speed at temperatures outside the temperature region does not essentially influence the particle properties of the product PAS particles. Accordingly, it becomes possible to produce PAS particles having good particle properties while shortening the entire polymerization cycle through shortening of the entire cooling time, if the system is subjected to gradual cooling within the above-mentioned temperature range of the maximum system-viscosity temperature ±1.0° C., and in temperature ranges outside the temperature range, the system is subjected to cooling at as large a cooling speed as possible, preferably by adopting a cooling means allowing rapid cooling.

Thus, according to the present invention, there is provided a process for producing polyarylene sulfide, comprising: reacting an aromatic dihalide compound and an alkaline metal compound in a polar organic solvent for polymerization under heating, and cooling a system including the reaction mixture to recover particulate polyarylene sulfide, wherein the system after the reaction is gradually cooled at an average cooling speed of 0.2 to 1.0° C./min. selectively in a temperature range of maximum system-viscosity temperature ±1° C.

DESCRIPTION OF PREFERRED EMBODIMENTS

Hereinbelow, the present invention will be described more specifically with respect to preferred embodiments.

(Alkaline Metal Compound)

Examples of the alkaline metal compound used in the present invention may include: alkaline metal sulfides, such as lithium sulfide, sodium sulfide, potassium sulfide, rubidium sulfide, cesium sulfide, and mixtures of two or more species of the above. These alkaline metal sulfides are generally sold in the form of hydrates and may be used as such. Examples of the hydrates may include: sodium sulfide nona-hydrate ($Na_2S.9H_2O$) and sodium sulfide penta-hydrate ($Na_2S.5H_2O$). The alkaline metal sulfide may also be used as an aqueous mixture. Further, the alkaline metal sulfide can also be prepared in situ in an organic amide solvent from alkaline metal hydrosulfide and alkaline metal hydroxide. It is also possible to use an alkaline metal hydroxide together with an alkaline metal sulfide so as to have the alkaline metal hydroxide react with a minor amount of alkaline metal hydrosulfide or alkaline metal thiosulfate possibly contained in the alkaline metal sulfide, thereby removing or converting the minor amount component into alkaline metal sulfide. Among the alkaline metal sulfides, sodium sulfide and sodium hydrosulfide are particularly preferred in view of the inexpensiveness.

Water to be removed in the dehydration step in the production process of the present invention may include: hydrate water of the above-mentioned hydrate, aqueous medium of the aqueous mixture, water by-produced by the reaction between the alkaline metal hydrosulfide and the alkaline metal hydroxide, etc.

(Aromatic Dihalide Compound)

The aromatic dihalide compound used in the present invention is an aromatic compound having two halogen atoms directly bonded to the aromatic ring. Specific examples of the aromatic dihalide compound may include: o-dihalobenzene, m-dihalobenzene, p-dihalobenzene, dihalotoluene, dihalonaphthalene, methoxy-dihalobenzene, dihalotoluene, dihalonaphthalene, methoxy-dihalobenzene, dihalobiphenyl, dihalobenzoic acid, dihalodiphenyl ether, dihalodiphenylsulfone, dihalodiphenyl sulfoxide, and dihalodiphenyl ketone. Herein, the halogen atoms each refer to an atom of fluorine, chlorine, bromine or iodine, and the two halogen atoms contained in one aromatic dihalide compound may be the same or different. The aromatic dihalide compound can have one or more of substituents, such as carboxyl group, hydroxy group, nitro group, amino group and sulfonic acid group. In the case of having plural substituent groups, the species of the substituent groups may be single or a combination of different species. These aromatic dihalide compounds may respectively be used singly or in combination of two or more species in an amount of 0.9 to 1.20 mols with respect to 1 mol of the charged alkaline metal sulfide.

(Molecular Weight-adjusting Agent, Branching or Crosslinking Agent)

A monohalide compound (which can be a non-aromatic compound, if desired) can be used in addition to the aromatic dihalide compound so as to form a terminal of the product PAS, regulate the polymerization reaction or adjust the molecular weight of the product PAS. It is also possible to co-use a polyhalide compound (which can be a non-aromatic compound, if desired) having three or more halogen atoms, an active hydrogen-containing aromatic halide compound, a halogenated aromatic nitro compound, etc. so as to form a branched or crosslinked polymer. A preferred example of the polyhalide compound as a branching or crosslinking agent may be trihalobenzen.

(Polar Organic Solvent)

In the present invention, it is preferred to use an organic amide solvent that is a non-protonic polar organic solvent as a solvent for the polymerization reaction and the product PAS recovery. The organic amide solvent may preferably be one which is stable against the alkali at high temperatures. Specific examples of the organic amide solvent may include: amide compounds, such as N,N-dimethylformamide, and N,N-dimethyl-acetamide; N-alkylpyrrolidone compounds or N-cycloalkylpyrrolidone compounds, such as N-methyl-ε-caprolactam, N-methyl-2-pyrrolidone (hereinafter sometimes referred to as "NMP") and N-cylohexyl-2-pyrrolidone; N,N-dialkyl imidazolidinone compounds, such as 1,3-dialkyl-2-imidazolidinone; tetraalkylurea compounds, such as tetramethylurea; and hexaalkylphosphoric acid triamide compounds, such as hexamethylphosphoric acid triamide. These organic amide solvents may respectively be used singly or in combination of two or more species. Among these organic amide compounds, N-alkylpyrrolidone compounds, N-chcloalkylpyrrolidone compounds and N,N-dialkylimidazolidinone compounds are preferred, and NMP, N-methyl-ε-caprolactam and 1,3-dialkyl-2-imidazolidinone are particularly preferred. The organic amide solvent used in the polymerization reaction may ordinarily be used in an amount in the range of 0.1 to 10 kg per mol of the alkaline metal sulfide compound.

(Phase Separation Agent)

In the present invention, it is preferred to use a phase separation agent for provide two phases, i.e., a thick polymer phase and a dilute polymer phase, in order to accelerate the polymerization to obtain a high polymerization-degree PAS in a short time. Specific examples of the phase separation agent may include: organic sulfonic acid metal salts, lithium halides, organic carboxylic acid metal salts, phosphoric acid alkaline metal salts and water, which are generally known as polymerization aids for PAS. These phase separation agents may be used singly or in combination of two or more species. The amount of the phase separation agent may vary depending on the chemical species thereof but may ordinarily be selected from the range of 0.01 to 10 mols per mol of the charged alkaline metal sulfide. The phase separation agent may be co-present from the stage of charging the other polymerization starting materials or may be added in the course of polymerization so as to provide an amount sufficient to cause the phase separation.

(Reaction Under Heating)

In the present invention, PAS may be produced by subjecting an alkaline metal sulfide and an aromatic dihalide compound to polymerization reaction under heating in an organic amide solvent. The step of reaction under heating may be divided into a dehydration step and a polymerization step. More specifically, prior to the polymerization step, a mixture composing an organic amide solvent and an alkaline metal sulfide and containing water is subjected to dehydration under heating so as to adjust the water content in the polymerization system. (Dehydration step) After the dehydration step, the mixture obtained in the dehydration step and an aromatic dihalide compound are mixed, and the alkaline metal sulfide and the aromatic dihalide compound are heated for polymerization reaction in the organic amide solvent.

(Polymerization Step)

(Dehydration Step)

The dehydration step is effected by heating an alkaline metal sulfide in an organic amide solvent, desirably under an inert gas atmosphere, to distill off water out of the reaction system. The alkaline metal sulfide is ordinarily served in the form of a hydrate or an aqueous mixture and therefore contains water in an amount larger than necessity. Further, in the case of using an alkaline metal hydrosulfide as the sulfide source, a nearly equal mol of an alkaline metal hydroxide is added thereto, and the two alkaline metal compounds are reacted in situ in the organic amide solvent to be converted into an alkaline metal sulfide. Water is by-produced in the conversion step. In the dehydration step, an amount of water including such hydrate water (crystalline water), aqueous medium and by-produced water is dehydrated so as to be reduced to a necessary level. More specifically, the dehydration step is ordinarily operated until the water content co-present in the polymerization system is reduced to about 0.3 to 5 mols per mol of the alkaline metal sulfide. In case where the water content is excessively reduced in the dehydration step, water may be added prior to the polymerization step so as to provide the desirable water content level.

The charging of the above-mentioned starting materials may be performed ordinarily in a temperature range of room temperature to 300° C. preferably a range of room temperature to 200° C. The starting materials may be charged into the reaction vessel in an arbitrary order and the respective materials may be additionally charged in the course of the dehydration operation. As mentioned above, an organic amide solvent is used as the solvent for the dehydration step, and the solvent may preferably be of the same species as the organic amide solvent used in the polymerization step, particularly preferably NMP. The solvent may ordinarily be used in an amount of 0.1 to 10 kg per mol of the charged alkaline metal sulfide.

The dehydration operation may be achieved by heating the composition of materials charged in an temperature range of ordinarily at most 300° C. preferably 60° C. to 280° C., for a period of ordinarily 15 minutes to 24 hours, preferably 30 minutes to 10 hours. The heating may be performed at a constant temperature, at temperatures elevated stepwise or continuously or by a combination of these. The dehydration operation may be performed batchwise, continuously or by a combination of these. The dehydration may be operated in an apparatus which may be identical to or different from a reaction vessel used in the subsequent polymerization step. In the dehydration step, a portion of the organic amide solvent is distilled off together with water by distillation, and the water may be separated from the organic amide solvent by subsequent distillation. Further, hydrogen sulfide is discharged together with water or the organic amide solvent. The hydrogen sulfide discharged can be recovered for re-utilization by an appropriate method, such as absorption with an aqueous alkaline solution.

(Polymerization Step)

The polymerization step is performed by mixing the composition after completion of the dehydration step with an aromatic dihalide compound, and heating the resultant mixture. At the time of preparing the mixture, it is possible to adjust the amounts of the organic amide solvent and water present together therewith, and also possible to add other materials, such as a polymerization aid. The mixing of the composition after the dehydration step and the aromatic dihalide compound may be performed in a temperature range of ordinarily 100 to 350° C. preferably 120 to 350° C. The order of the mixing is not particularly restricted, and the two components may be added portion by portion or added all at once. Further, the mixing of the hydrogen sulfide-absorbing liquid for recovering the hydrogen sulfide discharged in the dehydration step may also be performed in an appropriate order.

The polymerization reaction may be performed in a temperature range of generally 100 to 350° C. preferably 150 to 330° C. The heating for the reaction may be performed at a constant temperature, at temperatures increased stepwise or continuously, or by a combination of these. The polymerization reaction time is selected from a range of generally 10 minutes to 72 hours, preferably 30 minutes to 48 hours. The organic amide solvent used in the polymerization step is ordinarily 0.1 to 10 kg, preferably 0.15 to 1 kg, per mol of the sulfur used in the polymerization step. The amount of the solvent can be changed during the polymerization within the above-mentioned range.

In the present invention, it is preferred to adopt a phase-separation polymerization mode capable of providing a relatively high-molecular weight PAS wherein a phase separation agent is added to the polymerization system at an arbitrary time from the commencement to the completion of the polymerization. As the phase separation agent, it is preferred to use water in view of the cost, easiness of removal from the polymer, etc. In the case of causing phase separation by increasing the amount of water co-present in the polymerization system, water may be added at an arbitrary time from the start to the end of the polymerization. As an example of polymerization process involving a water content increased in the course of polymerization, there has been known a process wherein the reaction is caused to proceed in the presence of water in an amount of 0.5 to 2.4 mols per mol of the alkaline metal sulfide up to a conversion of 50 to 98 mol % of the aromatic dihalide compound, then water is added so as to provide a water content of 2.5 to 7.0 mols per mol of the alkaline metal sulfide and the temperature is elevated to 245 to 290° C. to continue the reaction (Japanese Patent Publication (JP-B) 63-33775), and the process is particularly preferably used in the present invention.

(Cooling)

Then, the reaction system (i.e., the content in the polymerization reaction vessel) is cooled under stirring. The cooling may be effected according to a so-called indirect heat-transfer scheme of causing heat-exchange with a heat medium via a heat transfer surface and using cooling means, such as a reaction vessel side-wall jacket contacting the liquid phase of the reaction mixture, heat-transfer tubes disposed in the liquid phase, a side-wall jacket and heat-transfer tubes disposed to contact the gaseous phase in the reaction vessel, and a heat-exchanger accompanied with condensation by using, e.g., a reflux condenser. These cooling means may be used singly or in combination, as desired.

However, it has been discovered by us that gradual cooling should be effected selectively in a range of extreme proximity to the maximum system-viscosity temperature in the course of cooling for the purpose of improving the properties of the product PAS particles. Accordingly, it is preferred to realize as large a cooling speed as possible in temperature regions outside the above-mentioned range, thereby shortening the entire cooling time, and therefore the entire polymerization cycle time for achieving a good production efficiency. For this purpose, it is preferred to effect efficient cooling by adopting, among the above-mentioned cooling means, a rapid cooling means of a better cooling efficiency, i.e., a reflux condenser disposed at an upper part of the reaction vessel (in a sense of including a cooling coil exposed to the gaseous phase in the reaction vessel) for condensing condensable components including water in the gaseous phase and mixing the condensed liquid with the polymerization liquid phase under stirring. In this instance, it is preferred to improve the condensation heat-transfer efficiency of the reflux condenser by removing at least a portion of non-condensable gaseous components from the gaseous phase at the top of the reflux condenser (as disclosed in Japanese Patent Application 2001-296545). The removal of the non-condensable gaseous components from the gaseous phase may be effected by, e.g., purging out of the system.

After the polymerization reaction, the system is cooled at as large a cooling speed as possible down to proximity of the maximum system-viscosity temperature, then gradually cooled selectively in the temperature region of the maximum system-viscosity temperature ±1° C., and then cooled again at an increased cooling speed down to a temperature at which the reaction mixture exhibits a vapor pressure below the atmospheric pressure. The maximum system-viscosity temperature can be easily detected as a temperature giving a maximum of power or current supplied to the stirrer or a reading of a torque meter attached to the stirring shaft.

The above-mentioned operation cycle is an ideal one based on our discovery for obtaining product PAS particles having good particle properties as represented by a high bulk density through as short a cooling cycle as possible. In an actual polymerization reaction system, however, it is impossible to ignore a thermal inertia including the heat capacity of the reaction vessel. Accordingly, in an actual cooling operation, it is preferred to effect a preliminary test for an objective polymerization reaction system for obtaining system parameters inclusive of the maximum system-viscosity temperature and a temperature cycle for realizing the selective gradual cooling in proximity to the maximum system-viscosity temperature, thereby setting a realizable cooling temperature cycle model, and to effect the control operation inclusive of the start, stop and exchange of the cooling means, and the increase or decrease of cooling medium supply rate, according to the cooling temperature cycle model.

More specifically, in the process of the present invention, the system is gradually cooled at an average cooling speed of 0.2 to 1.0° C./min. selectively in a temperature range of maximum system-viscosity temperature ±1° C. in the course of the cooling of the system. In view of the thermal inertia of the system, however, it is practically impossible to satisfy the above-mentioned condition and also realize a cooling speed exceeding 1.0° C./min. over the whole regions outside the range of the maximum system-viscosity temperature ±1° C. including the vicinity of the range: Accordingly, the condition of "the system after the reaction is gradually cooled at an average cooling speed of 0.2 to 1.0° C./min. selectively in a temperature range of maximum system-viscosity temperature ±1° C." of the present invention means that the system is cooled at a cooling speed (not an average cooling speed) exceeding 1.0° C./min., preferably at least 2.0° C./min., further preferably at least 3.0° C./min., in the temperature regions outside a range of maximum system-viscosity temperature ±3° C., preferably outside a range of maximum system-viscosity temperature ±2° C. For the purpose of stably improving the particle properties of the product PAS particles without incurring a substantial increase of the cooling cycletime, it is also preferred to keep an average cooling speed in the range of 0.2 to 1.0° C./min. over a temperature range of the maximum system-viscosity temperature ±2.0° C. Incidentally, a gradual cooling speed of below 0.2° C./min. in the selected temperature range in proximity to the maximum system-viscosity temperature incurs an increased cooling time in the temperature range which cannot be ignored and is thus not preferable.

(Post-treatment)

The slurry containing the product PAS particles obtained through the above-mentioned cooling step may be post-treated in an ordinary manner. For example, the cooled product slurry may be subjected to filtration as it is or after dilution with water, etc., and the recovered PAS particles may be subjected to a repetition of washing with water and filtration, followed by drying, to obtain a product PAS. After the above-mentioned filtration or sieving, PAS can be washed with an organic solvent such as an organic amide solvent identical to the polymerization solvent, a ketone or an alcohol, or high-temperature water. It is also possible to treat the product PAS with an acid or a salt, such as ammonium chloride.

(Product Polymer)

The product PAS obtained through the process of the present invention may be formed into various injection-molded products, and extrusion products, such as sheets, films, fibers and pipes, by itself or together with various inorganic fillers, fibrous fillers or various synthetic resins mixed therewith.

EXAMPLES

Hereinbelow, the present invention will be described more specifically based on Examples and Comparative Examples. It should be understood however that the present invention is not restricted to such Examples. Incidentally, physical properties described herein are based on values measured according to the following methods.

(1) Polymer melt viscosity was measured at 310° C. and a shearing speed of 1200/sec.

(2) Each product after the polymerization reaction was subjected to sieving through a screen having an opening diameter of 150 μm (100 mesh) to recover a particulate polymer thereon. The yield of the particulate polymer was calculated as a weight percentage thereof with respect to a weight (theoretical) of PAS calculated on an assumption that sodium sulfide present in an autoclave (reaction vessel) after the dehydration step was fully converted into PAS.

(3) Bulk density of a polymer was measured by using a bulk specific gravity meter (made by Tokyo Kuramochi Kagaku Kiki Seisakusho K.K.) according to JIS-K6721.

(4) A maximum system-viscosity temperature was detected based on a maximum value of consumed power measured by a clamp power meter ("CW140", made by Yokogawa Denki K.K.) disposed on a stirrer motor for the autoclave.

Example 1

Polymerization and cooling were performed by an apparatus including a 20 liter-autoclave (reaction vessel), and a cylindrical condenser having an inner diameter of 40 mm and a height of 250 mm and vertically installed at the top of the autoclave. The autoclave was further equipped with an electric heater capable of heat conduction from the side wall surface, a thermometer and a pressure gauge for detecting the inner temperature and pressure, and a stirrer. The condenser was equipped with a thermometer for measuring a temperature of the upper gaseous phase.

More specifically, 6,000 g of NMP and 3500 g of sodium sulfide penta-hydrate containing 45.9 wt. % of sodium sulfide ($Na_2S$) were charged in the reaction vessel, and after aeration with nitrogen gas, the system was gradually heated to 200° C. under stirring, thereby distilling off 1449 g of water and 1015 g of NMP. In this instance, 0.43 mol of $H_2S$ was discharged by vaporization. Accordingly, the effective amount of $Na_2S$ in the reaction vessel after the dehydration step was reduced to 20.14 mols. The vaporized $H_2S$ corresponded to 2.10 mol. % of the charged $Na_2S$.

Then, the reaction vessel containing 20.14 mols of effective $Na_2S$ was cooled to 180° C., and 3004 g of p-dichlorobenzene (pDCB)[pDCB/$Na_2S$=1.015 (by mol)], 3073 g of NMP, 114 g of water (total water content/$Na_2S$=1.50 (by mol)] and 35 g of NaOH (purity: 97%) so as to provide 6.00 mol % of NaOH with respect to the effective $Na_2S$ in the vessel were further charged to the vessel. Incidentally, the vessel already contained 0.86 mol of NaOH produced by the vaporization of $H_2S$.

The system was heated at 220° C. to cause reaction for 4.5 hours under operation of the stirrer at 250 rpm, then 472 g of water as the phase separation agent (giving a mol ratio of total water/$Na_2S$=2.8 in the vessel) was injected under pressure, and the system was heated to 260° C. for 5.0 hours of reaction to complete the polymerization.

After completion of the polymerization, the system was cooled in a manner described below. (Incidentally, the apparatus used in this Example was of a relatively small size, so that the cooling speed was controlled by controlling the operation conditions of the above-mentioned heater and condenser in combination with air-fan cooling from outside the polymerization vessel. In a larger-scale apparatus, however, the air-fan cooling (and heater) will be replaced by indirect heat exchange by a side-wall jacket or an intra-vessel cooling coil supplied with a thermal medium for controlling the cooling speed.)

More specifically, after completion of the polymerization, power supply to the side-wall heater was cut off at a temperature of 260° C. inside the vessel and cooling water was supplied to the condenser to start the cooling. Thereafter, the water supply rate to the condenser and the air supply rate to the outer wall of the polymerization vessel were controlled and a valve at the top of the condenser was opened as required for purging non-condensable gas out of the polymerization vessel, thereby effecting the cooling according to a temperature profile shown in Table 1. In the course of cooling, at a time of 7.5 minutes from the start of the cooling, a maximum of stirring power (162 W) was detected at a temperature of 229.7° C. (inside the vessel) to confirm the maximum system viscosity, and the temperature reached 228.7° C. after 2 minutes thereafter. Table 1 shows temperatures corresponding to the maximum system-viscosity temperature +5° C., +3° C., +2° C., +1° C., ±0° C. (maximum system-viscosity temperature), -1° C., -2° C., -3° C., and -5° C., time after the start of cooling at the respective temperatures, an average cooling speed in the temperature range of maximum system-viscosity temperature ±1° C., and average cooling speeds in temperature regions outside the temperature range.

A time period from the start of the cooling to 150° C. was 31 minutes. Thereafter, the reaction liquid was taken out of the reaction vessel.

(Washing-drying)

The thus-obtained reaction mixture was subjected to 3 cycles of washing-filtration by adding acetone, followed by 4 times of washing by adding room-temperature water. The resultant slurry was subjected to washing with acetic acid aqueous solution added thereto and filtration, followed further by four times of washing with water and sieving to recover a solid wet resin. The wet resin was dried at 105° C. for 13 hours in a tray drier. As a result, the dried resin (PPS) was recovered at 1922 g (yield: 88%), and exhibited a melt viscosity of 194 Pa·s and a bulk density of 0.37 g/cm³.

The temperature profile data and the bulk density data of the product are shown in Tables 1 and 2 appearing hereinafter together with those of Examples and Comparative Examples described below;

Example 2

Polymerization, cooling and washing-drying were performed in the same manner as in Example 1 except for changing the cooling temperature profile as shown in Table 1 by changing the conditions for water supply to the condenser and air supply to the outer wall of the polymerization vessel after the polymerization and cutting-off of the side-wall heater at a temperature inside the vessel of 260° C. As a result, particulate PPS exhibiting a melt viscosity of 226 Pa·s and a bulk density of 0.37 g/cm³ was obtained at a yield of 87%. The time period from the start of the cooling to 150° C. was 50 minutes.

Comparative Example 1

Polymerization, cooling and washing-drying were performed in the same manner as in Example 1 except for changing the cooling temperature profile as shown in Table 2 by changing the conditions for water supply to the condenser and air supply to the outer wall of the polymerization vessel after the polymerization and cutting-off of the sidewall heater at a temperature inside the vessel of 260° C. More specifically, after cutting off the power supply to the heater, the system was cooled by standing without water supply to the condenser or air supply to the outer wall of the polymerization. At a point of 77 minutes after the start of the cooling by standing, a maximum system-viscosity temperature of 234.3° C. was confirmed, and at 3.6 minutes thereafter, the temperature reached 233.3° C. At this point, air supply to the outer wall of the polymerization vessel was started to accelerate the cooling. The time period from the start of the cooling to 150° C. was 150 minutes.

As a result, particulate PPS exhibiting a melt viscosity of 150 Pa·s and a bulk density of 0.36 g/cm³ was obtained at a yield of 90%.

The bulk density of the product PAS particles was similar to those of Examples 1 and 2, and therefore it is understood that gradual cooling over the entire course of cooling did not result in further improvement in particle properties of the product PAS.

Comparative Example 2

Polymerization, cooling and washing-drying were performed in the same manner as in Example 1 except for changing the cooling temperature profile as shown in Table 2 by changing the conditions for water supply to the condenser and air supply to the outer wall of the polymerization vessel after the polymerization and cutting-off of the sidewall heater at a temperature inside the vessel of 260° C. Cutting off of water supply to the condenser for achieving a lower cooling speed in proximity to the maximum system-viscosity temperature (performed in the preceding Example) was not performed. As a result, particulate PPS exhibiting a melt viscosity of 145 Pa·s and a bulk density of 0.28 g/cm³ was obtained at a yield of 90%. The time period from the start of the cooling to 150° C. was 59 minutes.

Thus, in spite of the fact that a uniform cooling speed of 1.7° C./min. was adopted over a temperature range of about 236–226° C. including the maximum system-viscosity temperature and a longer cooling time from the start of cooling to 150° C. was used than in Example 1 and 2, the bulk density of the product PAS particles was substantially lowered to 0.28 g/cm³ because the average cooling speed of 1.7° C./min. in the temperature range of maximum system-viscosity temperature ±1° C. (and ±2° C.) was excessively large.

Comparative Example 3

Polymerization, cooling and washing-drying were performed in the same manner as in Example 1 except for changing the cooling temperature profile as shown in Table 2 by changing the conditions for water supply to the condenser and air supply to the outer wall of the polymerization vessel after the polymerization and cutting-off of the sidewall heater at a temperature inside the vessel of 260° C. Cutting-off of water supply to the condenser for achieving a lower cooling speed in proximity to the maximum system-viscosity temperature was not performed. As a result, particulate PPS exhibiting a melt viscosity of 145 Pa·s and a bulk density of 0.24 g/cm³ was obtained at a yield of 90%. The time period from the start of the cooling to 150° C. was 29 minutes.

The product PAS particles exhibited a further lowered bulk density of 0.24 g/cm³ presumably because the cooling speed in proximity to the maximum system-viscosity temperature was further higher than in Comparative Example 2, so that the particles were understood to have lost particle properties suitable for transportation, storage, etc.

The outlines of cooling and the product bulk densities in the above Examples and Comparative Examples are inclusively shown in the following Tables 1 and 2.

TABLE 1

Temperature profile in the cooling stage and product bulk density. (Examples)

| | Example 1 | | | Example 2 | | |
|---|---|---|---|---|---|---|
| Temp. difference from MSVT* (° C.) | Time (min.) | Temp. (° C.) | Cooling Speed (° C./min.) | Time (min.) | Temp. (° C.) | Cooling Speed (° C./min.) |
| (Cooling start) | 0 | 260 | 5.1 | 0 | 260 | 2.0 |
| +5 | 5.0 | 234.7 | 4.0 | 11.8 | 236.1 | 2.2 |
| +3 | 5.5 | 232.7 | 2.5 | 10.9 | 234.1 | 2.0 |
| +2 | 5.9 | 231.7 | 1.6 | 10.4 | 233.1 | 0.6 |
| +1 | 6.5 | 230.7 | ↑ | 12 | 232.1 | ↑ |
| 0 | 7.5 | 229.7 | 0.7 | 14 | 231.1 | 0.4 |
| −1 | 9.5 | 228.7 | ↓ | 16.5 | 230.1 | ↓ |
| −2 | 10.5 | 227.7 | 1.0 | 17.7 | 229.1 | 0.8 |
| −3 | 10.9 | 226.7 | 2.5 | 18.1 | 228.1 | 2.5 |
| −5 | 11.5 | 224.7 | 3.3 | 18.9 | 226.1 | 2.5 |
| (Cooling end) | 31 | 150 | 2.5 | 50 | 150 | 2.4 |
| Bulk density (g/cm³) | | 0.37 | | | 0.37 | |

*MSVT = maximum system-viscosity temperature

TABLE 2

Temperature profile in the cooling stage and Product bulk density. (Comparative Examples)

| Temp. difference from MSVT* (° C.) | Comparative Example 1 | | | Comparative Example 2 | | | Comparative Example 3 | | |
|---|---|---|---|---|---|---|---|---|---|
| | Time (min.) | Temp. (° C.) | Cooling Speed (° C./min.) | Time (min.) | Temp. (° C.) | Cooling Speed (° C./min.) | Time (min.) | Temp. (° C.) | Cooling Speed (° C./min.) |
| (Cooling start) | 0 | 260 | 0.3 | 0 | 260 | 2.1 | 0 | 260 | 11 |
| +5 | 62.5 | 239.3 | 0.3 | 11.1 | 236.2 | 1.8 | 3.0 | 227.5 | 10 |
| +3 | 68.5 | 237.3 | 0.3 | 12.2 | 234.2 | 1.7 | 3.2 | 225.5 | 10 |
| +2 | 71.4 | 236.3 | 0.4 | 12.8 | 233.2 | 1.7 | 3.3 | 224.5 | 10 |
| +1 | 74.2 | 235.3 | ↑ | 13.4 | 232.2 | ↑ | 3.4 | 223.5 | ↑ |
| 0 | 77 | 234.3 | 0.3 | 14 | 231.2 | 1.7 | 3.5 | 222.5 | 10 |
| −1 | 80.6 | 233.3 | ↓ | 14.6 | 230.2 | ↓ | 3.6 | 221.5 | ↓ |
| −2 | 83.5 | 232.3 | 0.3 | 15.2 | 229.2 | 1.7 | 3.8 | 220.5 | 5.0 |
| −3 | 86.5 | 231.3 | 0.3 | 15.8 | 228.2 | 1.7 | 4.1 | 219.5 | 3.3 |
| −5 | 90.5 | 229.3 | 0.5 | 17.0 | 226.2 | 1.7 | 4.8 | 217.5 | 2.9 |
| (Cooling end) | 150 | 150 | 1.3 | 59 | 150 | 1.8 | 29 | 150 | 2.8 |
| Bulk density (g/cm$^3$) | | 0.36 | | | 0.28 | | | 0.24 | |

*MSVT = maximum system-viscosity temperature

INDUSTRIAL APPLICABILITY

As described above, according to the present invention, there is provided a process for producing through a relatively short polymerization cycle time such PAS particles having a high and stable bulk density as to exhibit good processability in transportation and storage, and excellent transportability in a hopper or screw of an extruder or a molding machine.

The invention claimed is:

1. A process for producing polyarylene sulfide, comprising: reacting an aromatic dihalide compound and an alkaline metal compound in a polar organic solvent for polymerization under heating, and cooling a system including the reaction mixture to recover particulate polyarylene sulfide, wherein the system after the reaction is gradually cooled at an average cooling speed of 0.2 to 1.0° C./min. selectively in a temperature range of maximum system-viscosity temperature ±1° C.

2. A process according to claim 1, wherein in the reaction under heating, a phase separation agent is added to a reaction system at a desired time from a start to an end of the reaction so as to form a liquid-liquid phase separation state including a thick phase and a dilute phase of product polymer, and then the cooling is started.

3. A process according to claim 2, wherein the phase separation agent is water.

4. A process according to claim 3, wherein the alkaline metal compound is an alkaline metal sulfide and the phase separation agent is water;

the reaction under heating includes a preceding step of reaction at a temperature in a range of 180° C. to 235° C. in the presence of 0.5 to 2.4 mols of water per mol of the charged alkaline metal sulfide to form a prepolymer at a conversion of 50 to 98 mol % of the aromatic dihalide compound, and a subsequent step of adding water so as to provide an amount of water exceeding 2.5 mols and at most 7.0 mols per mol of the charged alkaline metal sulfide in the reaction system and heating the system to a temperature of 245 to 290° C. to continue the reaction; and
after the reaction, the cooling is started.

5. A process according to claim 1, wherein the reaction and the cooling are performed in a reaction vessel equipped at its top with a reflux condenser as a principal cooling means for the cooling.

6. A process according to claim 5, wherein during the cooling, at least a portion of non-condensable gaseous component is removed from a top gaseous phase in the reflux condenser to enhance a cooling capacity of the reflux condenser.

7. A process according to claim 1, wherein the system is cooled at a cooling speed exceeding 1.0° C./min. outside a temperature range of maximum system-viscosity temperature ±3° C.

8. A process according to claim 7, wherein the system is cooled at a cooling speed of at least 2.0° C./min. outside the temperature range of maximum system-viscosity temperature ±3° C.

9. A process according to claim 1, wherein the system is cooled at a cooling speed exceeding 1.0° C./min. outside a temperature range of maximum system-viscosity temperature ±2° C.

10. A process according to claim 9, wherein the system is cooled at a cooling speed of at least 2.0° C./min. outside the temperature range of maximum system-viscosity temperature ±2° C.

11. A process according to claim 1, wherein the system is cooled at an average cooling speed of 0.2 to 1.0° C. in the temperature range of maximum system-viscosity temperature ±2° C.

12. A process according to claim 2, wherein the reaction and the cooling are performed in a reaction vessel equipped at its top with a reflux condenser as a principal cooling means for the cooling.

13. A process according to claim 3, wherein the reaction and the cooling are performed in a reaction vessel equipped at its top with a reflux condenser as a principal cooling means for the cooling.

14. A process according to claim 4, wherein the reaction and the cooling are performed in a reaction vessel equipped at its top with a reflux condenser as a principal cooling means for the cooling.

15. A process according to claim 2, wherein the system is cooled at a cooling speed exceeding 1.0° C./min. outside a temperature range of maximum system-viscosity temperature ±3° C.

16. A process according to claim 3, wherein the system is cooled at a cooling speed exceeding 1.0° C./min. outside a temperature range of maximum system-viscosity temperature ±3° C.

17. A process according to claim 4, wherein the system is cooled at a cooling speed exceeding 1.0° C./min. outside a temperature range of maximum system-viscosity temperature ±3° C.

18. A process according to claim 5, wherein the system is cooled at a cooling speed exceeding 1.0° C./min. outside a temperature range of maximum system-viscosity temperature ±3° C.

19. A process according to claim 6, wherein the system is cooled at a cooling speed exceeding 1.0° C./min. outside a temperature range of maximum system-viscosity temperature ±3° C.

20. A process according to claim 2, wherein the system is cooled at a cooling speed exceeding 1.0° C./min. outside a temperature range of maximum-system-viscosity temperature ±2° C.

21. A process according to claim 3, wherein the system is cooled at a cooling speed exceeding 1.0° C./min. outside a temperature range of maximum system-viscosity temperature ±2° C.

22. A process according to claim 4, wherein the system is cooled at a cooling speed exceeding 1.0° C./min. outside a temperature range of maximum system-viscosity temperature ±2° C.

23. A process according to claim 5, wherein the system is cooled at a cooling speed exceeding 1.0° C./min. outside a temperature range of maximum system-viscosity temperature ±2° C.

24. A process according to claim 6, wherein the system is cooled at a cooling speed exceeding 1.0° C./min. outside a temperature range of maximum system-viscosity temperature ±2° C.

25. A process according to claim 2, wherein the system is cooled at an average cooling speed of 0.2 to 1.0° C. in the temperature range of maximum system-viscosity temperature ±2° C.

26. A process according to claim 3, wherein the system is cooled at an average cooling speed of 0.2 to 1.0° C. in the temperature range of maximum system-viscosity temperature ±2° C.

27. A process according to claim 4, wherein the system is cooled at an average cooling speed of 0.2 to 1.0° C. in the temperature range of maximum system-viscosity temperature ±2° C.

28. A process according to claim 5, wherein the system is cooled at an average cooling speed of 0.2 to 1.0° C. in the temperature range of maximum system-viscosity temperature ±2° C.

29. A process according to claim 6, wherein the system is cooled at an average cooling speed of 0.2 to 1.0° C. in the temperature range of maximum system-viscosity temperature ±2° C.

30. A process according to claim 7, wherein the system is cooled at an average cooling speed of 0.2 to 1.0° C. in the temperature range of maximum system-viscosity temperature ±2° C.

31. A process according to claim 8, wherein the system is cooled at an average cooling speed of 0.2 to 1.0° C. in the temperature range of maximum system-viscosity temperature ±2° C.

32. A process according to claim 9, wherein the system is cooled at an average cooling speed of 0.2 to 1.0° C. in the temperature range of maximum system-viscosity temperature ±2° C.

33. A process according to claim 10, wherein the system is cooled at an average cooling speed of 0.2 to 1.0° C. in the temperature range of maximum system-viscosity temperature ±2° C.

* * * * *